March 25, 1952  D. W. SHIRLEY  2,590,581
DEVICE FOR AERATING WATER
Filed Feb. 6, 1950
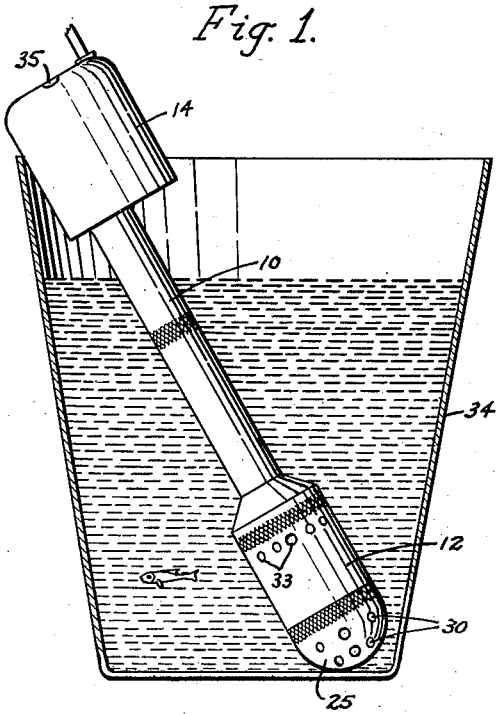
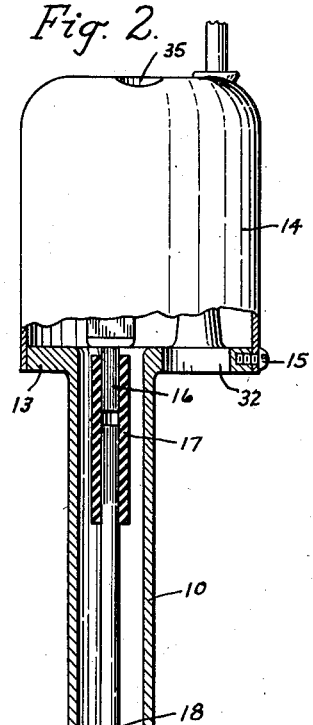
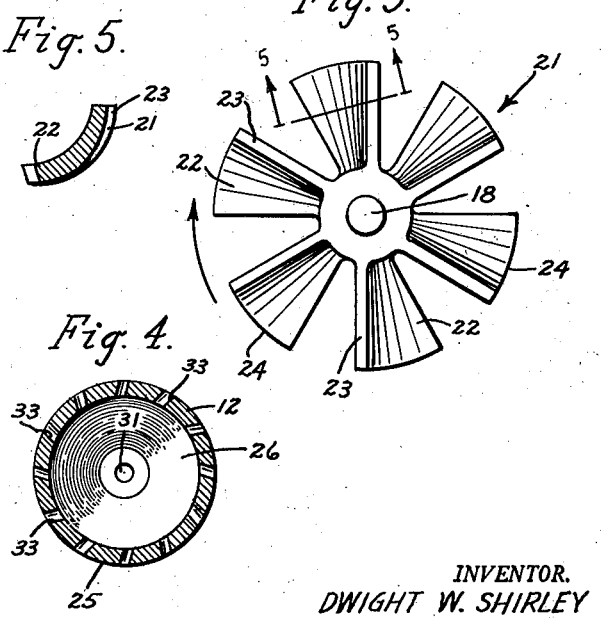
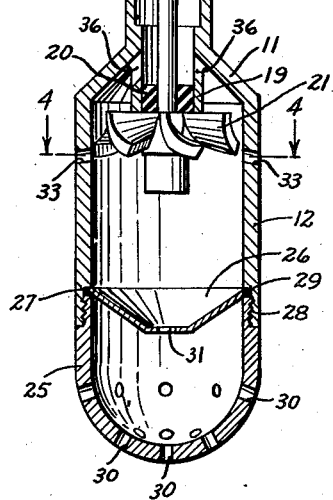
INVENTOR.
DWIGHT W. SHIRLEY
BY
*G. H. Braddock*
ATTORNEY.

Patented Mar. 25, 1952

2,590,581

UNITED STATES PATENT OFFICE 2,590,581

DEVICE FOR AERATING WATER

Dwight W. Shirley, Cumberland, Wis.

Application February 6, 1950, Serial No. 142,582

2 Claims. (Cl. 261—93)

This application is a continuation in part of my now abandoned application Serial No. 108,801, for a Device for Aerating Water, filed August 5, 1949.

The invention herein has relation to a device for feeding air into water, as, for example, water containing live fish being transported or confined for intended future use.

The object of the invention is to provide a device for aerating water, especially useful for the purpose of keeping minnows and larger fish alive, wherein will be incorporated desirable, novel and improved features and characteristics of construction.

In the accompanying drawing forming a part of this specification,

Fig. 1 is a side elevational view of a device for aerating water made according to the invention as when applied to use;

Fig. 2 is an enlarged central longitudinal sectional view of the new and improved device;

Fig. 3 is a further enlarged top plan view of an actuator of the device;

Fig. 4 is a transverse sectional view, taken as on line 4—4 in Fig. 2; and

Fig. 5 is a detail sectional view of a blade of said actuator, taken on line 5—5 in Fig. 3.

With respect to the drawing and the numerals of reference thereon, a housing of the device for aerating water is constituted as an upper hollow entity, consisting of a first cylindrical element 10, and a lower hollow entity, consisting of an inverted cup shape element 11 and a second cylindrical element 12. The inverted cup shape element 11 is below and alined with the first cylindrical element 10, and as disclosed said inverted cup shape element and first cylindrical element are integrally connected. The second cylindrical element 12 is below and alined with the inverted cup shape element 11, the upper edge of said second cylindrical element is integrally connected with the lower edge of said inverted cup shape element, and the second cylindrical element is of greater diameter than and in concentric relation to the first cylindrical element.

The upper end of said first cylindrical element integrally supports a flange portion 13, in perpendicular relation to the first cylindrical element, and an electric motor 14 is fixedly supported upon said flange portion, by screws 15 as disclosed, in alined relation with the upper and lower hollow entities of the housing.

A shaft 16 of the electric motor 14 is flexibly connected, as at 17, to an elongated shaft 18 which extends through the first cylindrical element 10 and the inverted cup shape element 11 into the second cylindrical element 12. The elongated shaft 18 is in spaced, concentric relation to said first cylindrical element, said inverted cup shape element and said second cylindrical element, and the free end of said elongated shaft terminates within the second cylindrical element in spaced relation to its lower end.

A neck or annular projection 19, alined with the first cylindrical element 10 and integral with the inverted cup shape element 11, extends downwardly through said inverted cup shape element into the upper end of the second cylindrical element 12, and the lower end portion of the elongated shaft 18 is rotatably mounted in a water lubricated bushing 20 fixedly supported in the lower end of said neck or annular projection 19.

An actuator 21 of the device for aerating water, situated within an upper portion of the second cylindrical element 12 in adjacent relation to the lower end of the neck or annular projection 19, is fixedly supported upon the motor driven elongated shaft 18. The actuator is disposed in perpendicular relation to said elongated shaft 18, and will be driven in the direction denoted by the arrow in Fig. 3 when the electric motor 14 is energized. As shown, said actuator includes six radially extending blades, although a greater or less number of blades could be employed. Each blade of the actuator is of construction as plainly disclosed in Figs. 3 and 5, including an upwardly and forwardly slanting rear length 22 merging into an upwardly and forwardly slanting front length 23. The circumferential edge of each blade, constituted as the circumferential edges of the rear and front lengths 22 and 23, is of arcuate configuration, as indicated at 24, and the construction and arrangement will be such that all of the arcuate edges 24 lie in a single circumference, in proximate but clearing relation to the internal surface of the second cylindrical element 12. Desirably, the rear lengths 22 of the actuator blades and their rear edges may slant slightly downwardly from the elongated shaft 18, the outer end of the rear edge of the rear length of each actuator blade may terminate in a plane somewhat beneath the lower end of the neck or annular projection 19 and in perpendicular relation to said elongated shaft, and the front edge of the forward length of each actuator blade may terminate substantially in the plane of said lower end of said neck or annular projection 19.

A closure member for the lower end of the second cylindrical element 12 is represented 25, and a partition retained in said lower end of said second cylindrical element by said closure member is indicated 26. As disclosed, said partition is of general conical configuration and an upper surface of an outer margin thereof is contiguous with a downwardly facing, interior annular shoulder 27 at a lower portion of the second cylindrical element. The closure member 25 is removably threaded, as at 28, in said second cylindrical element, and an annular surface 29 bounding or defining the upper end of said closure member is engaged against a lower surface of the outer margin of the partition 26 to retain said partition in clamped position between the second cylindrical element and the closure member.

Said closure member 25 is of dome shape, and circumferentially spaced ports 30 in the closure member are contiguous at their inner ends with the interior of said closure member and at their outer ends with a circumferential outer surface of the closure member. The partition 26 includes a port 31, and the ports 30 and 31 provide inlets for flow of water into the lower hollow entity of the housing.

An opening 32 through the flange portion 13 provides an inlet for flow of air into the upper open end of the first cylindrical element 10, openings 36 through the neck or projection 19 provide inlets for flow of air into the upper end of the second cylindrical element 12, and circumferentially spaced ports 33 through a portion of said second cylindrical element at the elevation of the lower end of the actuator 21 provide outlets for flow of air and water from the second cylindrical element. All of the circumferentially spaced ports 33 slant in the same direction, and each port 33 extends both outwardly and downwardly and in oblique relation to a plane passed longitudinally and diametrically through said second cylindrical element, as clearly disclosed in Figs. 2 and 4.

In Fig. 1 of the drawing, the new and improved device is disclosed as when applied to use. The device is inserted in a vessel or bucket 34 so that the closure member 25 rests upon the base of said vessel or bucket and the first cylindrical element 10 is at least partially disposed above the level of water in the vessel or bucket.

The electric motor 14 may be energized in any suitable and convenient manner. By way of example, when live fish are to be transported by automotive vehicle, said electric motor may be connected in a circuit including the battery of the automotive vehicle and also including the cigar lighter socket customarily situated upon the vehicle dash board, and when fish are to be confined for intended future use, as when carried to a body of water for employment as bait, the electric motor of the device may be connected in a circuit supplied from a power line through the instrumentality of a suitable transformer. The specific manner in which the electric motor 14 is to be energized forms no part of the present invention.

Rotation of the actuator 21 at comparatively high speed creates eddy currents in the water in the second cylindrical element 12 providing a vortex which causes air to be sucked or pulled into the housing through the opening 32 in the flange portion 13, and rotation of said actuator also forces air and water to travel from said second cylindrical element, by way of the ports 33, into the water in the vessel or bucket, such as 34, surrounding the lower portion of the housing of the device. Stated differently, the actuator 21 functions both as a suction blower causing air to be drawn through the opening 32 and the upper hollow entity into the lower hollow entity of the housing and an impeller causing mixed air and water to be forced through the ports 33 out of said lower hollow entity into the vessel or bucket. The actuator 21 spins the water to cause air to be sucked down. Spinning of the water itself creates vacuum or suction below the actuator thus to produce the vortex. The construction and arrangement will be such that there will be no water above the elevation of the actuator 21 while it is in operation, and the intended water level in the lower hollow entity of the housing constantly will be maintained by reason of flow of water from the vessel or bucket into said lower hollow entity by way of the ports 30 through the closure member 25 and the port 31 through the partition 26. The actuator blades 21 are of configuration to pull air downwardly through the upper hollow entity and the inverted cup shape element 11 into the upper portion of the second cylindrical element 12, and also to force mixed air and water outwardly through the ports 33. The vortex centers, or is most severe, at the general location of the actuator blades and the outlet ports 33, and air, commingled with water, in considerable amount is forced through said outlet ports 33 in response to rotation of said actuator blades.

By reason of the fact that the outlet ports 33 slant in oblique relation to a plane passed longitudinally and diametrically through the second cylindrical element 12, entry of mixed air and water into a vessel or bucket, such as 34, from said outlet ports is in direction to cause water in the vessel or bucket to be rotatively agitated, and thus more suitable than would otherwise be the case for the preservation of the lives of fish. While the device will, by experiment and experience, cause oxygen of the air to be fed into and become dissolved in water in a vessel or bucket containing fish in more than ample amount sufficient for preservation of the lives of fish even though the water is not caused to be agitated, it is a well known fact that water which constantly is in motion is more conducive to preservation of fish life than is still or stagnant water, probably because swimming of fish against currents of moving water requires exercise which is beneficial.

The forcing of mixed air and water out of the upper portion of the second cylindrical element 12 by way of the outlet ports 33 is attended by creation of vacuum or suction in the lower portion of said second cylindrical element. Were the partition 26 with port 31 not included, vacuum or suction would be created at the interior ends of the ports 30 through the closure member 25, and in instances when fish, especially minnows and other small fish, came close to the exterior ends of said ports 30 they might be sucked or drawn up against said closure member and unable to get loose. The partition 26 with port 31 is employed to the end that the possibility of creation of vacuum or suction at any of the several ports 30 through the closure member 25 will be precluded. Instead, the ports 30 will be sufficient in size and number and the port 31 small enough to insure that water removed from the upper end of the closure member by way of the port 31 through the partition 26 will be replaced by gravity and with occurrence of insufficient vacuum or suction at any of the ports 30 to cause even the smallest of fish to become trapped.

It will be evident that a closure member, such as 25, of length, greater or less, different from that of the one disclosed can be employed when it is desired to situate the actuator 21 at a different, higher or lower, elevation in a body of water. That is, closure members, such as 25, of variable length can be employed selectively to increase or decrease the overall length of the device, thus to situate the actuator 21 at desired elevation in a vessel or bucket with the electric motor 14 and the air inlet opening 32 above the water level.

The electric motor 14 as disclosed includes a shell with upper air opening 35, and the construction and arrangement are such that rotation of the actuator 21 also will cause air to be drawn down by way of said opening 35 through said shell thus to have tendency toward keeping said electric motor cool.

What is claimed is:

1. A device of the character described comprising an elongated housing including a first hollow element providing a first inlet passageway for a gas at an upper portion of said housing, a second hollow element providing a second inlet passageway for a liquid at a lower portion of the housing, there being circumferentially spaced outlets for said gas and liquid at an upper portion of said second hollow element, and an inverted cup shape element between and connecting said first and second hollow elements, a hollow projection extending downwardly from said first hollow element in spaced relation to said inverted cup shape element, a shaft to be rotated extending longitudinally through said first hollow element in spaced relation thereto, through said hollow projection and into an upper portion of said second hollow element, there being an inlet for flow of air from said first inlet passageway by way of an exterior portion of said hollow projection to said inverted cup shape element and second hollow element and the hollow projection being otherwise closed to the inverted cup shape element and the second hollow element, an actuator in said second hollow element in proximate relation to a lower portion of said hollow projection at the elevation of and in adjacent relation to said gas and liquid circumferentially spaced outlets constituted as a disc member including radially extending blades for drawing gas through said first inlet passageway and said hollow projection over and around an upper, external surface of the disc member and forcing gas and liquid out of said housing by way of said circumferentially spaced outlets, a stationary ported partition in said second hollow element in spaced relation to said actuator, a closure member for a lower portion of the second hollow element including inlet ports at the side of said ported partition opposite the actuator, and means for rotating said actuator.

2. The combination as specified in claim 1 wherein said circumferentially spaced outlets are in oblique relation to a plane passed longitudinally and diametrically through said housing.

DWIGHT W. SHIRLEY.

REFERENCES CITED

The following references are of record in the file of this patent:

UNITED STATES PATENTS

| Number | Name | Date |
| --- | --- | --- |
| 1,417,895 | Fahrenwald | May 30, 1922 |
| 1,894,864 | Hall | Jan. 17, 1933 |
| 1,976,956 | MacLean | Oct. 16, 1934 |
| 2,194,037 | Thuma | Mar. 19, 1940 |

FOREIGN PATENTS

| Number | Country | Date |
| --- | --- | --- |
| 466,143 | Great Britain | May 24, 1937 |